United States Patent
Baumgartner

(10) Patent No.: US 7,578,722 B1
(45) Date of Patent: Aug. 25, 2009

(54) APPARATUS AND METHOD TO DISPENSE, VAPORIZE AND DELIVER PESTICIDE INTO A BEEHIVE

(76) Inventor: Willy F. Baumgartner, #4, 55-9th Avenue SE, Calgary, AB (CA) T1V 1E6

( * ) Notice: Subject to any disclaimer, the term of this patent is extended or adjusted under 35 U.S.C. 154(b) by 423 days.

(21) Appl. No.: 11/654,319

(22) Filed: Jan. 18, 2007

(51) Int. Cl.
*A01K 51/00* (2006.01)
*A01K 55/00* (2006.01)

(52) U.S. Cl. .............. 449/2; 449/61; 43/129

(58) Field of Classification Search ......... 449/2, 449/61; 43/128, 129; 422/288; 239/136
See application file for complete search history.

(56) References Cited

U.S. PATENT DOCUMENTS

| | | | | |
|---|---|---|---|---|
| 3,694,146 A | * | 9/1972 | Roy | 422/124 |
| 4,260,873 A | * | 4/1981 | Simmonds | 392/404 |
| 5,305,541 A | * | 4/1994 | Simpson | 43/1 |
| 5,644,866 A | * | 7/1997 | Katsuda et al. | 43/129 |
| 6,050,016 A | * | 4/2000 | Cox | 43/1 |

* cited by examiner

*Primary Examiner*—Rob Swiatek
(74) *Attorney, Agent, or Firm*—Red Gallagher; G. F. Gallinger

(57) ABSTRACT

An apparatus for vaporizing and blowing vaporized pesticide from a container into a bee hive comprising: i) an elongate housing having a top side portion, an open front discharge end portion and a partially closed rear end portion; ii) a heated receptacle positioned within a front portion of the housing; iii) a fan positioned within a rear portion of the housing; iv) a longitudinal slide, slidingly positioned within the top side portion of the housing, said slide having a rear manipulation end portion extending through the rear end portion of the elongate housing and a front end portion having a dosimetric cavity therethrough; and, v) a container receptacle to receive the pesticide container carried inverted on the top side portion of the elongate housing, positioned above the slide and configured so that when the dosimeter cavity is aligned beneath the container, the dosimeter cavity fills with pesticide, and then when the slide is moved sufficiently longitudinally, the pesticide is delivered to and then falls through an opening onto the heated receptacle to be vaporized, and thereafter is blown by the fan through the discharge end portion of the housing into the bee hive.

14 Claims, 2 Drawing Sheets

APPARATUS AND METHOD TO DISPENSE, VAPORIZE AND DELIVER PESTICIDE INTO A BEEHIVE

FIELD OF THE INVENTION

This invention relates to parasite control in bee hives. More particularly this invention relates to an apparatus and method for inexpensive and efficient control of parasites in a bee hive using oxalic acid.

BACKGROUND OF THE INVENTION

Parasites, and more particularly the parasites, varroa jacobsini are an ongoing problem for Queen Producers, Package Bee Producers, Honey Producers, Beekeepers engaged in crop pollination. All presently available methods of treating infested hives require the users to initially open the infested hives and insert a chemical therein which is toxic to the parasites. After approximately six weeks the hives must be reopened and the chemical initially inserted therein must be removed. Prior to both the opening and the reopening of the hives, the bees therein must be pacified with smoke. This process is extremely time consuming. Another problem with these processes is that during the extended period of exposure to the inserted chemicals, the honey in the hives becomes tainted. Yet another problem with these existing treatment methods, is that in addition to the expense of the intense labor involved, the chemicals themselves are expensive. To treat ten thousand hives, chemicals typically cost $40,000. Yet another problem is resistance build up. The treatment chemicals used must be rotated every 2-3 years to avoid resistance build up.

What is needed is a quick treatment, a treatment and method of application which can be undertaken without opening the hives. Most preferably the treatment should not require a user to subsequently reopen the hives to remove undissipated chemical therefrom thereby avoiding a repeat of the time consuming process of pacifying the bees with smoke and reclosing the hive. Ideally the chemical which is toxic to the parasites should be relatively non-toxic to people. It would be preferable if the parasites could not build resistance to the chemical employed so that it would not be necessary monitor stocks and rotation of the chemicals. And finally, the use of a parasitic compound which is relatively inexpensive would be unquestionably preferred.

OBJECTS OF THE INVENTION

It is an object of this invention to disclose an apparatus and method of quickly purging a bee hive of parasites. A method facilitating injection of a toxic compound externally from outside the hive, into the hive thereby avoiding the time consuming process of opening the hive, smoking and pacifying the bees in the hive and reclosing the hive. It is an object of this invention to disclose a method and apparatus of purging a bee hive of parasites. It is yet a further object of this invention to disclose an apparatus and method for a "one shot" removal of parasites. The method disclosed herein neither requires a six week exposure to toxic chemicals nor subsequent reopening of the hive and removal of those chemicals. Additionally the chemical employed which is toxic to the bees is relatively non-toxic to people. Oxalic acid, found in food greens, is totally harmless to people. When injected as a vapor it is lethal to the parasites. It immediately dissipates in the air. there is no need for removal and there is not even a significant increase of oxalic acid in the honey in the hive. And furthermore, there is no known case of resistance buildup by the parasites to oxalic acid. Oxalic acid is relatively inexpensive. Currently users of chemicals spend $40,000 to treat 10,000 hives. If they used oxalic acid, in addition to more significant labor, and lost production savings they would spend less than 5% of their prior chemical cost purchasing oxalic acid.

One aspect of this invention provides for an apparatus for vaporizing and blowing vaporized pesticide from a container into a bee hive comprising: i) an elongate housing having a top side portion, an open front discharge end portion and a partially closed rear end portion; ii) a heated receptacle positioned within a front portion of the housing; iii) a fan positioned within a rear portion of the housing; iv) a longitudinal slide, slidingly positioned within the top side portion of the housing, said slide having a rear manipulation end portion extending through the rear end portion of the elongate housing and a front end portion having a dosimetric cavity therethrough; and, v) a container receptacle to receive the pesticide container carried inverted on the top side portion of the elongate housing, positioned above the slide and configured so that when the dosimeter cavity is aligned beneath the container, the dosimeter cavity fills with pesticide, and then when the slide is moved sufficiently longitudinally, the pesticide is delivered to and then falls through an opening onto the heated receptacle to be vaporized, and thereafter is blown by the fan through the discharge end portion of the housing into the bee hive.

A method of vaporizing and blowing vaporized pesticide into an infected bee hive comprising the steps of: i) providing an apparatus as described above; ii) filling the pesticide container with pesticide and attaching the container to a top side portion of the housing; iii) prewarming the apparatus; iv) pressing the slide forward to thereby fill the dosimetric cavity therein with pesticide; v) positioning the discharge end portion of the housing in the entrance to the infected bee hive; and, vi) retracting the slide thereby turning on the fan and blowing vaporized pesticide into the bee hive within seconds.

Various other objects, advantages and features of this invention will become apparent to those skilled in the art from the following description in conjunction with the accompanying drawings.

FIGURES OF THE INVENTION

Figure 1:
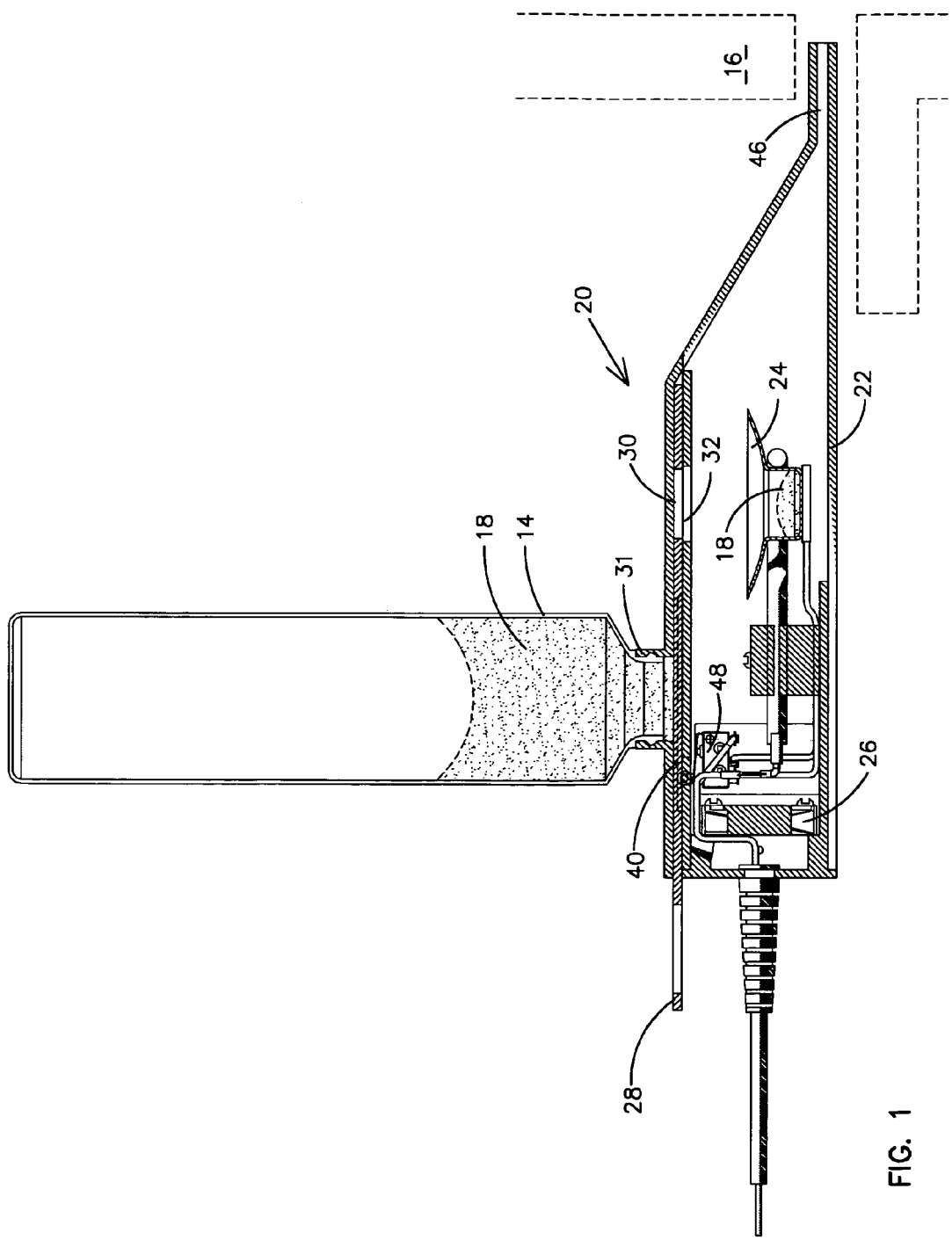
FIG. 1 is a cross sectional view of an apparatus for vaporizing and blowing pesticide into a bee hive.

The following is a discussion and description of the preferred specific embodiments of this invention, such being made with reference to the drawings, wherein the same reference numerals are used to indicate the same or similar parts and/or structure. It should be noted that such discussion and description is not meant to unduly limit the scope of the invention.

DESCRIPTION OF THE INVENTION

Figure 2:
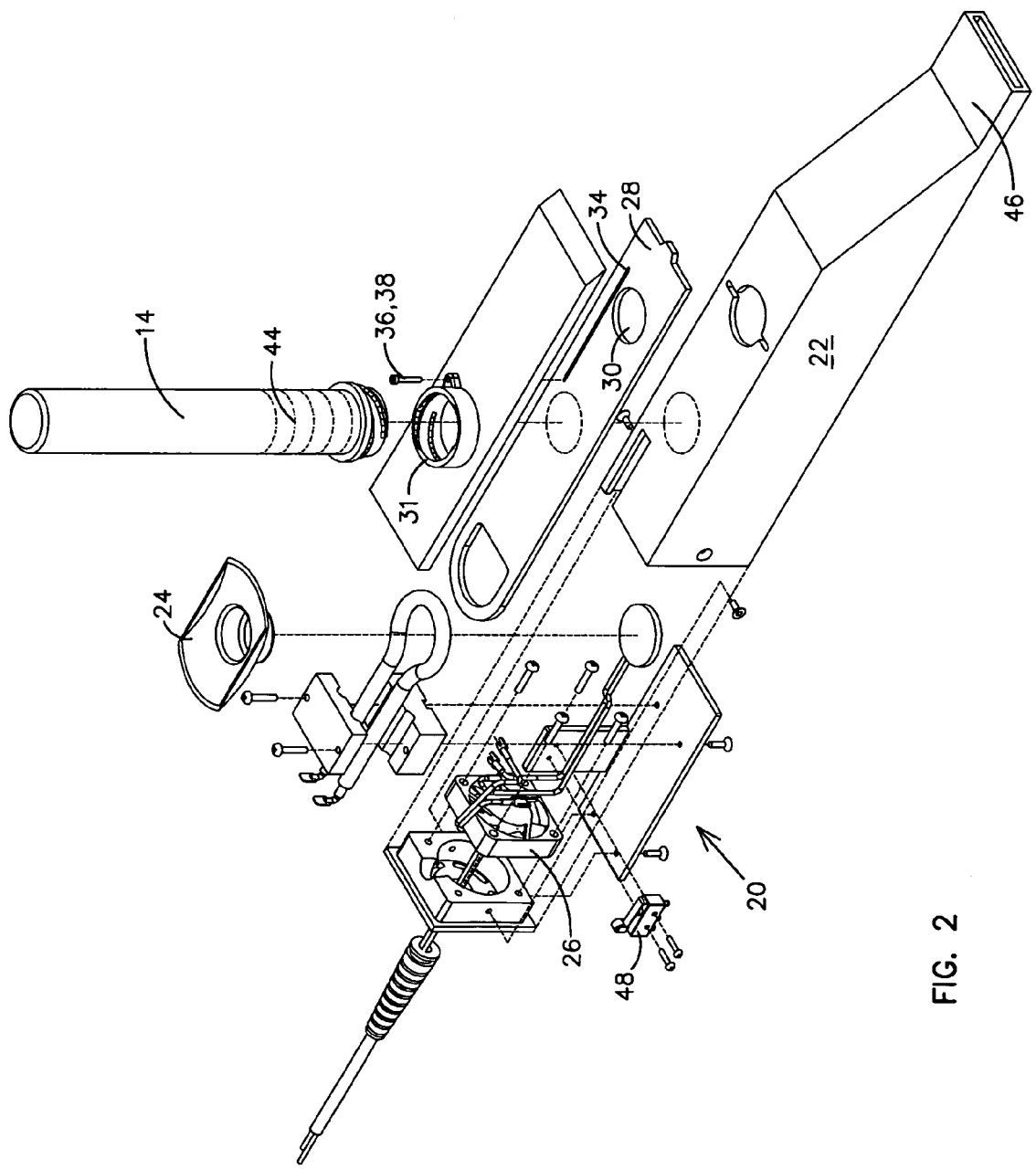
FIG. 2 is an exploded perspective view of the apparatus shown in FIG. 1.

Turning now to the drawings and more particularly to FIG. 1 we have a cross sectional view of an apparatus for vaporizing and blowing pesticide into a bee hive. FIG. 2 is an exploded perspective view of the apparatus shown in FIG. 1. An apparatus 20 for vaporizing and blowing vaporized pesticide 18 from a container 14 into a bee hive 16 comprises: i) an elongate housing 22 having a top side portion, an open front discharge end portion and a closed rear end portion; ii) a heated receptacle 24 positioned within a front portion of the housing 22; iii) a fan 26 positioned within a rear portion of the housing 22; iv) a longitudinal slide 28, slidingly positioned within the top side portion of the housing 22, said slide 28 having a rear manipulation end portion extending through the rear end portion of the elongate housing and a front end portion having a dosimetric cavity 30 therethrough; and, v) a container receptacle 31 to receive the pesticide container 14 carried inverted on the top side portion of the elongate housing 22, positioned above the slide 28 and configured so that when the dosimetric cavity 30 is aligned beneath the container 14, the dosimetric cavity 30 fills with pesticide 18, and then when the slide 28 is moved sufficiently longitudinally, the pesticide is delivered to and then 18 falls through an opening 32 onto the heated receptacle 24 to be vaporized, and thereafter is blown by the fan 26 through the discharge end portion of the housing 22 into the bee hive 16. As shown in the drawings the container receptacle 31 most preferably has an interior thread to engage the container 14 neck. It should be noted that while the apparatus 20 is designed to work with the pesticide 18 oxalic acid, it is contemplated that the invention could function using different pesticides 18.

Most preferably the slide cavity 30 is volumetrically sized to meter and deliver a precise amount of pesticide 18 and wherein the slide 28 is removable and interchangeable with similar slides 28 having differently sized volumetric cavities, so that varying doses of pesticide 18 may be delivered to the receptacle with different slides 28. Most preferably the movement of the slide 28 may be restricted between a rear cavity filling position and a forward drop position. In the most preferred embodiment of the invention the restriction comprises a upper groove 34 in an upper side of the slide 28 which is engaged by a protrusion 36 downwardly extending from the housing into the groove 34. Most preferably the protrusion comprises a screw 38 which can be removed to remove the slide 28.

In the most preferred embodiment of the invention, the fan 26 is configured to be in an off position while the pesticide is being delivered to the heated receptacle 24 to prevent the pesticide 18 from being blown prior to vaporization. A lower groove 40 (shown in FIG. 1) in an under side portion of the slide 28 is utilized to activate the fan 26 by sliding switch 48. When the slide 28 is in a rear position the fan 26 is on. Forward movement of the slide 28 delivers the pesticide 18 to the drop position. When the slide 28 is in even a partially forward position the fan 26 is off and pesticide can be delivered to the heated receptacle 24 without blowing the unvaporized pesticide 18. If the fan 26 and heater and heated receptacle 24 are powered by 12 VDC, then a battery (not shown) may be used as a power source.

In the most preferred embodiment of the invention the pesticide 18 is oxalic acid and is compressed into circular wafers 44. FIG. 1 shows a container 14 which contemplates the use of pesticide 18 which comprises crystals. The housing 22 comprises a discharge nozzle 46 having an interior reduced in size to permit insertion through the hive 16 bottom opening.

A method of vaporizing and blowing vaporized pesticide 18 into an infected bee hive 16 comprises the steps of: i) providing an apparatus 20 as in claim 1; ii) filling the pesticide container 14 with pesticide 18 and attaching the container 14 to a top side portion of the housing 22; iii) prewarming the apparatus 20; iv) pressing the slide 28 forward to thereby fill the dosimetric cavity 30 therein with pesticide 18; v) positioning the discharge end portion of the housing 22 in the entrance to the infected bee hive 16; and, vi) retracting the slide 28 thereby turning on the fan 26 and blowing vaporized pesticide 18 into the bee hive 16 within seconds. If the slide 28 further comprises an upper groove 34 and the housing 22 further comprises a screw 38 turned into the upper groove 34 to limit travel of the slide 28 between a rear filling/operational position and a forward drop position; then the method further comprises the step of turning the screw 38 out of the upper groove 34 and interchanging the slide 28 with another slide 28 having a dosimetric cavity 30 which better approximates the dose of pesticide 18 based on bee hive 16 size.

Most preferably the bee hive 16 is treated in the spring prior to the availability of nectar and in the fall after all surplus honey for human consumption is removed. It is noted that where multiple hives 16 are treated, it is unnecessary that the apparatus 20 cool below vaporizing temperature. It is also unnecessary to include the step of preheating the heated receptacle between the multiple hives 16. All other pesticide apparatuses available require cooling below vaporization temperature then preheating between multiple bee hives 16.

While the invention has been described with preferred specific embodiments thereof, it will be understood that this description is intended to illustrate and not to limit the scope of the invention, which is defined by the following claims.

I claim:

1. An apparatus for vaporizing and blowing vaporized pesticide from a container into a bee hive comprising:
   i) an elongate housing having a top side portion, an open front discharge end portion and a partially closed rear end portion;
   ii) a heated receptacle positioned within a front portion of the housing;
   iii) a fan positioned within a rear portion of the housing;
   iv) a longitudinal slide, slidingly positioned within the top side portion of the housing, said slide having a rear manipulation end portion extending through the rear end portion of the elongate housing and a front end portion having a dosimetric cavity therethrough; and,
   v) a container receptacle to receive the pesticide container carried inverted on the top side portion of the elongate housing, positioned above the slide and configured so that when the dosimeter cavity is aligned beneath the container, the dosimeter cavity fills with pesticide, and then when the slide is moved sufficiently longitudinally, the pesticide is delivered to and then falls through an opening onto the heated receptacle to be vaporized, and thereafter is blown by the fan through the discharge end portion of the housing into the bee hive.

2. An apparatus as in claim 1 wherein the slide cavity is volumetrically sized to meter and deliver a precise amount of pesticide and wherein the slide is removable and interchangeable with similar slides having differently sized volumetric cavities, so that varying doses of pesticide may be delivered to the heated receptacle with different slides.

3. An apparatus as in claim 2 wherein the movement of the slide may be restricted between a rear cavity filling position and a forward drop position.

4. An apparatus as in claim 2 wherein the restriction comprises an upper groove in an upper side of the slide which is engaged by a protrusion downwardly extending from the housing into the groove.

5. An apparatus as in claim 4 wherein the protrusion comprises a screw.

6. An apparatus as in claim 1 wherein the fan is configured to be in an off position while the pesticide is being delivered to the receptacle to prevent the pesticide from being blown prior to vaporization.

7. An apparatus as in claim 6 wherein a lower groove in an under side portion of the slide is utilized to activate the fan when the slide is in a rear position and turn off the fan when the slide is in a forward position while pesticide is being delivered to the heated receptacle.

8. An apparatus as in claim 1 wherein the fan, an air heater and heated receptacle are powered by 12 VDC so that a battery may be used as a power source.

9. An apparatus as in claim 1 wherein the pesticide comprises oxalic acid which is compressed into circular wafers.

10. An apparatus as in claim 1 wherein the housing comprises a discharge nozzle having an interior reduced in size to permit insertion through the hive bottom opening.

11. A method of vaporizing and blowing vaporized pesticide into an infected bee hive comprising the steps of:
  i) providing an apparatus as in claim 1;
  ii) filling the pesticide container with pesticide and attaching the container to a top side portion of the housing;
  iii) prewarming the apparatus;
  iv) pressing the slide forward to thereby fill the dosimetric cavity therein with pesticide;
  v) positioning the discharge end portion of the housing in the entrance to the infected beehive; and,
  vi) retracting the slide thereby turning on the fan and blowing vaporized pesticide into the bee hive within seconds.

12. A method as in claim 11 wherein the slide further comprises a top groove and the housing further comprises a screw turned into the upper groove to limit travel of the slide between a rear filling/operational position and a forward drop position; and wherein the method further comprises the step of turning the screw out of the upper groove and interchanging the slide with another slide having a dosimetric cavity which better approximates the dose of pesticide based on bee hive size.

13. A method as in claim 11 wherein the bee hive is treated in the spring prior to the availability of nectar and in the fall after all surplus honey for human consumption is removed.

14. A method as in claim 11 wherein multiple hives are treated without requiring that the apparatus cool below vaporizing temperature and without requiring the step of preheating the receptacle between the multiple bee hives.

* * * * *